US006466160B2

(12) United States Patent
Rexberg

(10) Patent No.: US 6,466,160 B2
(45) Date of Patent: Oct. 15, 2002

(54) SELF-CALIBRATION OF FEEDERS FOR ARRAY ANTENNAS

(75) Inventor: Leonard Rexberg, Hässelby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/813,020

(22) Filed: Mar. 21, 2001

(65) Prior Publication Data

US 2001/0045907 A1 Nov. 29, 2001

(30) Foreign Application Priority Data

Mar. 22, 2000 (SE) .............................................. 0000975

(51) Int. Cl.$^{7}$ ............................ G01S 7/40; G01S 13/00
(52) U.S. Cl. ........................................ 342/174; 342/157
(58) Field of Search ................................ 342/174, 157, 342/158, 368, 371–375

(56) References Cited

U.S. PATENT DOCUMENTS 3,883,870 A * 5/1975 Kunz ........................ 343/17.7
4,949,090 A 8/1990 Tamii et al. ................ 342/173
5,063,529 A * 11/1991 Chapoton .............. 364/571.02
5,559,519 A 9/1996 Fenner ....................... 342/174
5,682,165 A 10/1997 Lewis et al. ................ 342/174
5,929,809 A * 7/1999 Erlick et al. ................ 342/372
5,936,569 A * 8/1999 Stahle et al. ................ 342/174
6,255,986 B1 * 7/2001 Alberty et al. .............. 342/174

FOREIGN PATENT DOCUMENTS

DE 19941473 A1 9/2000

* cited by examiner

*Primary Examiner*—Thomas H. Tarcza
*Assistant Examiner*—Brian Andrea
(74) *Attorney, Agent, or Firm*—Burns Doane et al.

(57) ABSTRACT

The receive part of an array antenna of base station system may be interpreted as self-calibrating. However the transmit direction of the array antenna may not coincide with the receive direction due to the difference in receive and transmit frequency. The present application teaches how a correction be performed for the transmitting direction by using the same phase compensations of the receiving direction also in the transmitting direction with a proportional correction for the difference in transmit frequency. A Frequency Domain Duplex (FDD) system is foreseen as the prerequisite for the applicability of present invention, but it will also work for a Time Division Duplex (TDD) system. By calculating during reception a first feed cable weight set by means of an adaptive algorithm at the receive frequency a corresponding second cable weight set for a transmit frequency can be calculated. Applying the corresponding second cable weight set then forming a proportional phase correction for the array antenna feed cables at transmit frequency will facilitate a continuous beam steering with coinciding receive and transmit directions. No sensors at the antenna connector level at the top of the mast are necessary for this application.

7 Claims, 4 Drawing Sheets

| | 1 | 2 | 3 | 4 | 5 | 6 | 7 | 8 |
|---|---|---|---|---|---|---|---|---|
| Meters | 40 | 40,1 | 39,9 | 40,07 | 39,92 | 40,12 | 40,05 | 40,03 |
| Degrees | 0 | 108 | -108 | 75,6 | -86,4 | 129,6 | 54 | 32,4 |

SELF-CALIBRATION OF FEEDERS FOR ARRAY ANTENNAS

TECHNICAL FIELD

The present invention relates to self-calibration of feed cables to an array antenna, and more specifically it relates to calibration of antenna feed cables in a duplex configuration where the same feed cables for a receive direction are also used in the transmit direction.

BACKGROUND

Antenna arrays are more and more given the attention to give a boost of capacity to cellular networks as opposed to single sector antennas. These array antennas consist of several radiator groups connected together to give a main radiation direction while keeping radiation down in other directions.

However, in order for the array antenna to work properly, coherent signals are necessary in the aperture of the antenna. That is, we need some control of the phase of each signal in each antenna element of the array in order to shift a constructive interference to a desired direction. If this is accomplished, we have a steerable array antenna at our use.

The present technique for implementing array antennas is to use switched beams. In this way, the beam forming can be made once-and-for-all in a passive radio frequency (RF) network that can be connected to the antenna connectors at the top of the mast. In this case no calibration is needed of feed cables or the base station internally.

In other cases where calibration is needed (full steering of antenna beams), the feed cables are carefully measured and calibration equipment is installed internally in the base station. It is then relied on that the phase errors in the cables do not change too much over temperature and time.

It should be observed that it is generally only the transmit direction that needs some calibration. The direction of reception is already self-calibrated, because the signals can be made coherent as they are received by the radio.

However, on transmit, to make antenna signal coherent, it would mean installation of sensors at the top of the antenna mast and some additional control equipment.

The drawback of today's solution is that calibration of antenna feed cables at transmit frequency (and direction) requires some type of sensors in direct contact with the antenna connectors at the top of the antenna mast. It is not unusual that the height can be of the order 50 meters, so any additional active device at the antenna level is highly disliked by the operator in view of maintenance. On the other hand, if calibration of an antenna array is not implemented, one is forced to use switched beam solutions. This might in turn mean that nulling cannot be performed and that continuous beam steering is not possible. Gain drop in-between fixed beam directions is also a result of non-calibrated systems.

Therefore there is a definite demand for a self-calibration of array antenna feed cables to facilitate a continuous beam steering with coinciding receive and transmit directions in duplex operation configurations of cellular network base stations.

SUMMARY

The receive part of a cellular network base station system can be interpreted as self-calibrating and usually does not represent any problem. Instead the main concern is to be directed towards the transmit direction of the base station. The proposed method and system according to the present invention makes it is possible to utilize a common information from the feed cables to be used by both receive frequency and transmit frequency of the base station.

In the receive direction, algorithms tend to optimise the best performance by adding an appropriate phase to antenna branches. The present application teaches how the same thing also can be performed for the corresponding transmit direction by using the phase compensations of the receiving direction also in the transmit direction, but with a proportional correction for the difference in transmit frequency.

A method according to the present invention is set forth by the independent claim 1 and further embodiments are set forth by the dependent claims 2 to 3. Correspondingly a system using the present invention is set forth by the independent claim 4 and further embodiments are set forth by the dependent claims 5 to 6.

BRIEF DESCRIPTION OF THE DRAWINGS

The invention, together with further objects and advantages thereof, may best be understood by making reference to the following description taken together with the accompanying drawings, in which.

DETAILED DESCRIPTION

General Analysis

The present solution to the problem of facilitating a continuous beam steering with coinciding receive and transmit directions in a duplex operation configuration of a cellular network base station is to also in the transmit direction make use of the same phase compensations as will be obtained in the receiving direction, but with a proportional correction for the different transmit frequency.

As the cables form the main object of this calibration scheme, we will here disregard any other phase errors internally in the base station. In other words, it is assumed that calibration has already been performed (in some appropriate way) of internal parts of the base station, including the transmitter and receiver. This can be done by placing, for example, sensors in the signal paths and then compare signals to reveal differences in the signal paths (See FIG. 1). The figure indicates parts, which are internally calibrated in a conventional way and on the other hand a part, which is subject to self-calibration by means of the method according to the present invention. A Frequency Domain Duplex (FDD) system is foreseen as the prerequisite for the applicability of present invention, but it will also work for a Time Division Duplex (TDD) system.

Figure 1:
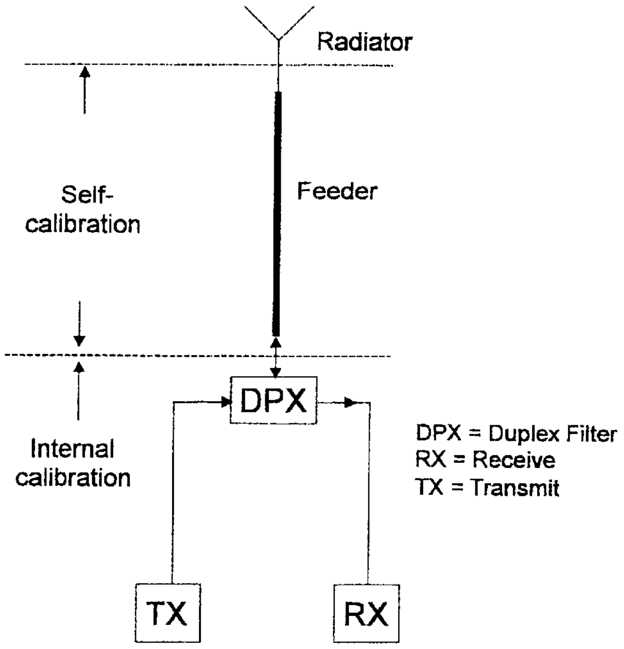
FIG. 1 is a schematic view of a radio base station consisting of a receive part, a transmit part and a common antenna with a feed cable.

According to a basic illustration in FIG. 1 an actual system of interest merely consists of an antenna feed cable and antenna radiator elements attached to the feed cable at the top of the antenna mast. Several branches may make up the array antenna.

Now, it is well known by a person skilled in the art that if a transmission medium is non-dispersive, then the phase of a carrier at a certain distance of propagation is proportional to the frequency. That is, if the frequency increases by x%, then the phase will also increase by x%. This effect will become even more pronounced when using several feeding cables, which are not perfectly equal in lengths. Other reasons for changes in phase might be different types of cables, or different temperatures of the cables. For simplicity identical types of cable having equal characteristics are assumed in FIGS. 2 and 3, respectively, illustrating the case for the receiving and transmitting frequency, respectively. Feed 1 may be assumed constituting the phase used as reference when steering antenna array direction.

In a duplex system the same feed cables will be used for the receive path and the transmit path. This may then be utilised for self-calibrating the antenna array by only using the signal coming from an outside source. It is not even necessary that the signal source is placed broadside to the array antenna, nor it will be necessary to know the angular position of this source. The main goal is to guarantee that the transmitted signal is given a direction being the same as the direction of the received signal, no matter if the receive direction is known or not.

Detailed Analysis

Figure 2:
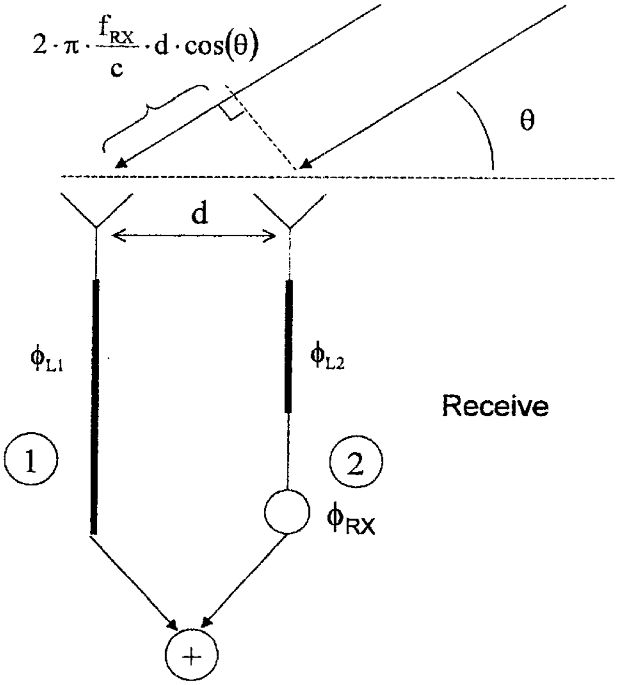
FIG. 2 shows a two-element array antenna with phase errors in the receive direction resulting from cables of different electrical length.

Let us exemplify the setup by considering a two-element system consisting of two cables and two antenna elements. Let us further assume that the antenna elements themselves are exactly identical (which should not impose any problem). In addition to the assumed above setup, let us further say that there is a signal coming in at an arbitrary (unknown) angle θ in relation to the broadside of the array as indicated in FIG. 2.

Condition for RX Calibration:

Then, to obtain maximum constructive interference we only have to make sure that the following phase equation will hold:

$$\phi_{L1} + 2\cdot\pi\cdot\frac{f_{RX}}{c}\cdot d\cdot\cos(\theta) = \phi_{L2} + \phi_{RX} \tag{1}$$

Then $\phi_{L1}$ and $\phi_{L2}$ represent the phase path of the respective feed cable, $f_{RX}$ denotes the reception frequency, c is the speed of light and d the distance between the two antenna elements.

The method to obtain the correct value for the phase $\phi_{RX}$ at the receiver input is to ensure that the phase difference between the two branches is zero. This can for example easily be done by correlation of the two received signals. This will be performed by using standard methods and will therefore not be further discussed here, but being regarded as methods known to persons skilled in the art.

Condition for TX Calibration:

Now, let us change the frequency to transmit frequency (See FIG. 3), and compare the two cases. At transmit frequency $f_{TX}$, the corresponding phase relation to be compared with Equation (1) will be:

$$\phi_{L1}\cdot\frac{f_{TX}}{f_{RX}} + 2\cdot\pi\cdot\frac{f_{TX}}{c}\cdot d\cdot\cos(\theta) = \phi_{L2}\cdot\frac{f_{TX}}{f_{RX}} + \phi_{TX} \tag{2}$$

Rearranging left side of Equation (2) then gives the following equation:

$$\frac{f_{TX}}{f_{RX}}\left(\phi_{L1} + 2\cdot\pi\cdot\frac{f_{RX}}{c}\cdot d\cdot\cos(\theta)\right) = \phi_{L2}\cdot\frac{f_{TX}}{f_{RX}} + \phi_{TX} \tag{3}$$

By utilizing that the expression within parenthesis corresponds to left side of Equation (1) above and replacing that by the right side of Equation (1), equation (3) is reduced to the following relation:

$$\frac{f_{TX}}{f_{RX}}(\phi_{L2} + \phi_{RX}) = \phi_{L2}\cdot\frac{f_{TX}}{f_{RX}} + \phi_{TX} \tag{4}$$

And from Equation (4) the final relation for phase excitations at receive frequency and transmit frequency is obtained as:

$$\frac{f_{TX}}{f_{RX}}\cdot\phi_{RX} = \phi_{TX} \tag{5}$$

That is, in order to steer an array antenna at frequency $f_{TX}$ to the same angular direction as the incoming signal at frequency $f_{RX}$, the same weight factors may be used but frequency scaled in proportion to the percentage frequency change. Thus, having computed weights $W_{RX}$ by some adaptive algorithm at the receive frequency, the appropriate weight set $W_{TX}$ for transmit frequency would be according to the following relation:

$$W_{TX}^{\langle k\rangle} = |W_{RX}^{\langle k\rangle}|\cdot e^{j\cdot\frac{f_{TX}}{f_{RX}}\cdot Arg\left(W_{RX}^{\langle k\rangle}\right)} \quad k = 1, 2, \ldots N \tag{6}$$

Where k is the index of the k:th antenna element in the array. Arg denotes the angular phase of the argument of $W_{RX}^{(k)}$, and N is the number of elements in the array (here N=2).

The above description only discusses two antenna elements, and one single signal coming in from one direction θ. However, the method also holds for any number of array antenna elements, and also for several in parallel incoming signals.

To resolve two signals, we assign for example one of two orthogonal tags to a respective of the two signals. This is already in use in the GSM-system by the training sequence. Then, using an adaptive beam forming algorithm well known for a person skilled in the art the two signals can be resolved and weights can be computed that will produce a main beam in the direction of one of the signals in the receive direction, while nulling out the other. For instance, such an adaptive beam forming algorithm to be used in an illustrative embodiment according to the invention is the Sample Matrix Inversion (SMI).

EXAMPLE

Figure 6:
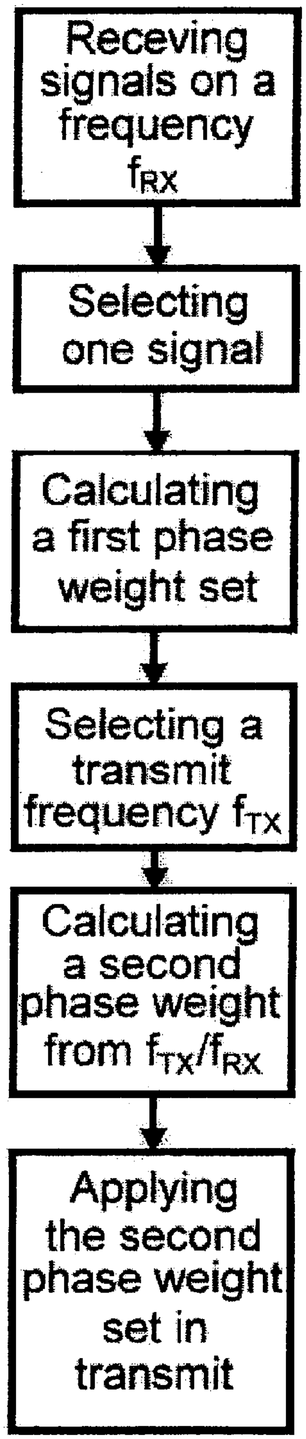
FIG. 6 illustrates a basic flow diagram of the method according to the present invention.

In FIG. 6 is shown a basic flow diagram illustrating the method of the present invention.

To illustrate the method, an array of 8 elements is chosen as an example. The element distance of the array antenna is 0.5λ at RX frequency, which then corresponds to 33.3 cm at 900 MHz.

Figures 3, 4:
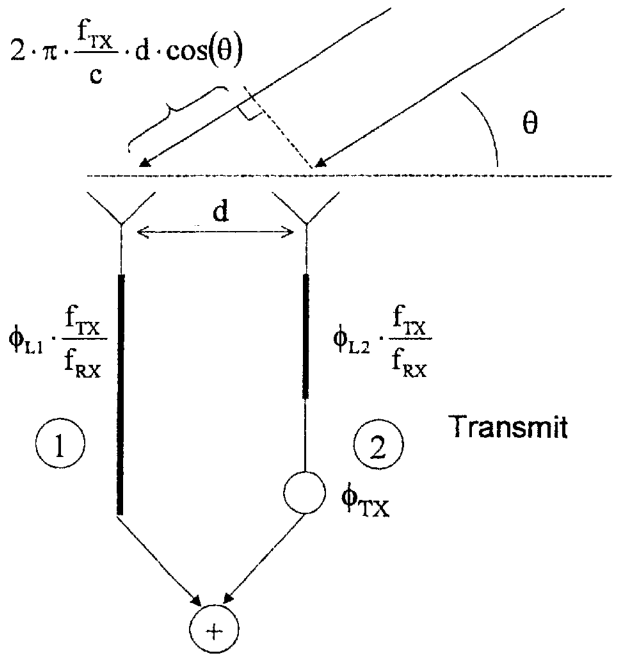
FIG. 3 shows a two-element array antenna with phase errors in the transmit direction resulting from cables of different electrical length.
FIG. 4 shows a table listing the length of feed cables used in an example utilizing an 8-element array.
Figure 5:
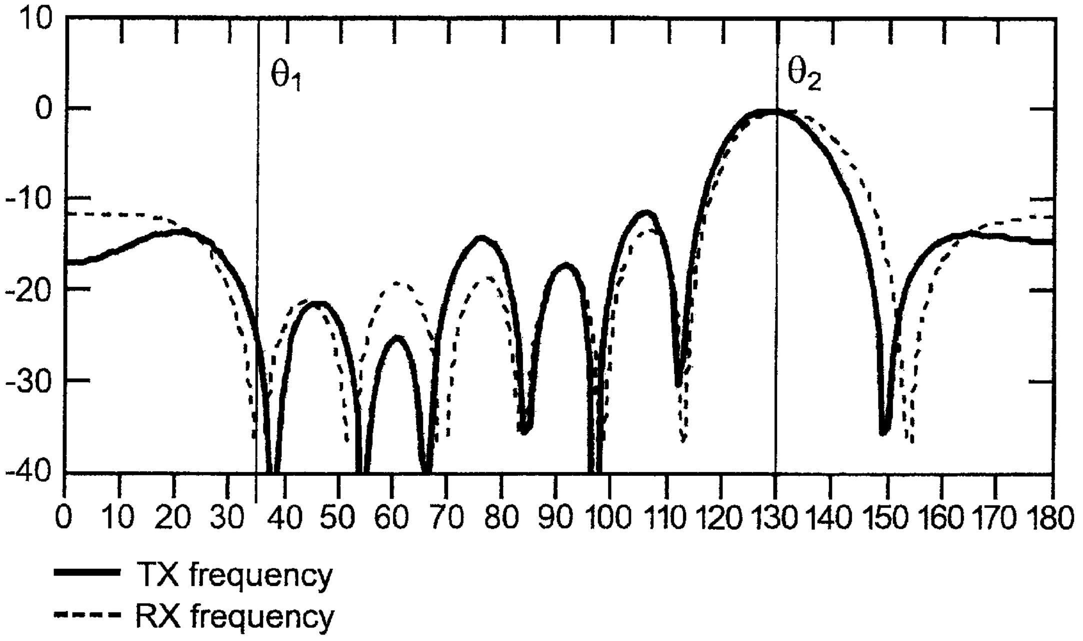
FIG. 5 illustrates an antenna diagram showing antenna patterns for a receiving frequency 900 MHz and a transmitting frequency 945 MHz with antenna feed cables of different lengths, and an antenna element distance being 0.5λ at receive frequency.

In the 8-element example feed cables to the antenna elements have the physical and electrical lengths according to FIG. 4. FIG. 5 illustrates an antenna diagram presenting respective antenna patterns for a receiving frequency 900 MHz and a transmitting frequency 945 MHz with antenna feed cables of the given different lengths, and the antenna element distance being 33.3 cm (0.5λ) at the receive frequency. Into this array, two signals of equal amplitude are impinging. In this example we chose incidence angles $\theta_1$=130° and $\theta_2$=35° (See FIG. 5). The 130°-direction is chosen as the wanted signal while the 35°-direction is nulled out.

It should be noted here that in order for the procedure to fully work, strictly the full electrical path length has to be accounted for. That is, for a feed cable of 40 meter we will have 40/0.333*360=43636.36° that should actually undergo the multiplication of $f_{TX}/f_{RX}$=945/900=1.05 in our example. However, measuring the received signal paths will only give information of the phase within 0°–360°. This clearly limits us to cases where we know that the physical difference between cable lengths does not exceed 360°=1λ. Submitted to this limitation, the proposed calculation will work well. It is not regarded as a major limitation to the present invention, since the physical feed cable lengths are generally known to that degree of accuracy and the possible difference generally always being less than one electrical wavelength λ. If differences are known to be longer than 1λ, then clearly compensations can be done including additional 360° when making the corrections for change in frequency.

It is seen that the antenna pattern calibrates itself at RX frequency (as it should) to steer the main beam into a main direction of θ=130° while making a nice null in another direction of θ=35°. But, which is more interesting, the antenna pattern also steers correctly in the transmit direction and at another frequency ($f_{TX}$). However, it does not null out the 35°-direction, but that is because we actually do not know this particular direction. The shift in the null from this position is merely an effect of changing the frequency and cannot be controlled unless we actually have knowledge about the actual signal directions. The same comment also holds for the middle sidelobe that tends to peak above the others. This disappears if there is only one single incident signal to that array antenna.

The merits of this invention are that no hardware or sensors have to be placed at the antenna connector level (at the top of the mast) to calibrate the antenna feeds. An incoming signal to the array antenna coming from an arbitrary direction (not known by the calibration control equipment) is enough to make necessary adjustments for the transmit direction and selected transmit frequency. Any other calibration is confined to be within the radio base-station itself. The invention applies to systems where the same cables for receive frequency are used as for the transmit frequency and at least one duplexer, DPX, is used.

It will be understood by those skilled in the art that various modifications and changes may be made to the present invention without departure from the scope thereof, which is defined by the appended claims.

What is claimed is:

1. A method for self calibration of feed cables of an array antenna for compensating a difference in receive and transmit frequency, comprising the steps of:

calculating a first feed cable phase weight set $W_{RX}^{(k)}$ during reception by an adaptive algorithm for a received signal at a receive frequency $f_{RX}$, wherein k is the index of the k:th antenna element in the array antenna and whereby a full electrical feed cable length is accounted for in the calculation;

calculating, from the first feed cable weight set $W_{RX}^{(k)}$, a corresponding second cable phase weight set $W_{TX}^{(k)}$ for a chosen transmit frequency $f_{TX}$ by applying a relation $$e^{j\cdot\frac{f_{TX}}{f_{RX}}}$$

to the first feed cable phase weight and angular phase; and applying the corresponding second cable phase weight set $W_{TX}^{(k)}$ as phase correction of the array antenna feed cables at transmit frequency $f_{TX}$, to thereby facilitate a continuous beam steering with coinciding receive and transmit directions.

2. A method for self calibration of feed cables of an array antenna for compensating a difference in receive and transmit frequency, comprising the steps of:

calculating a first feed cable phase weight set $W_{RX}^{(k)}$ during reception by an adaptive algorithm for a received signal at a receive frequency $f_{RX}$, wherein k is the index of the k:th antenna element in the array antenna and whereby a full electrical feed cable length is accounted for in the calculation;

calculating, from the first feed cable weight set $W_{RX}^{(k)}$, a corresponding second cable phase weight set $W_{TX}^{(k)}$ according to a relation defined by $$W_{TX}^{(k)} = |W_{RX}^{(k)}|\cdot e^{j\cdot\frac{f_{TX}}{f_{RX}}\cdot Arg\left(W_{RX}^{(k)}\right)}\quad k = 1, 2, \ldots N$$

where Arg denotes the angular phase of the argument of $W_{RX}^{(k)}$ and N is the number of elements in the array antenna; and applying the corresponding second cable phase weight set $W_{TX}^{(k)}$ as phase correction of the array antenna feed cables at transmit frequency $f_{TX}$, to thereby facilitate a continuous beam steering with coinciding receive and transmit directions.

3. The method according to claim 1, comprising the further step of using an adaptive beam forming algorithm such as a Sample Matrix Inversion (SMI) to compute a phase weight set that will produce a main transmit beam in the direction of one of the signals in the receive direction.

4. A system for self calibration of feed cables of an array antenna for compensating a difference in receive and transmit frequency, comprising:

means for calculating a first feed cable phase weight set $W_{RX}^{(k)}$ during reception by an adaptive algorithm for a received signal at a receive frequency $f_{RX}$, wherein k is the index of the k:th antenna element in the array antenna and whereby a full electrical feed cable length is accounted for;

means for calculating, from the first feed cable weight set $W_{RX}^{(k)}$, a corresponding second cable phase weight set $W_{TX}^{(k)}$ for a chosen transmit frequency $f_{TX}$ by applying a relation $$e^{j\cdot\frac{f_{TX}}{f_{RX}}}$$

to the first feed cable phase weight and angular phase; and means for applying the corresponding second cable phase weight set $W_{TX}^{(k)}$ as phase correction of the array antenna feed cables at transmit frequency $f_{TX}$, to thereby facilitate a continuous beam steering with coinciding receive and transmit directions.

5. A system for self calibration of feed cables of an array antenna for compensating a difference in receive and transmit frequency, comprising:

means for calculating a first feed cable phase weight set $W_{RX}^{(k)}$ during reception by an adaptive algorithm for a received signal at a receive frequency $f_{RX}$, wherein k is the index of the k:th antenna element in the array antenna and whereby a full electrical feed cable length is accounted for;

means for calculating, from the first feed cable weight set $W_{RX}^{(k)}$, a corresponding second cable phase weight set WTX(k) according to a relation defined as $$W_{TX}^{\langle k\rangle} = |W_{RX}^{\langle k\rangle}| \cdot e^{j \cdot \frac{f_{TX}}{f_{RX}} \cdot Arg\left(W_{RX}^{\langle k\rangle}\right)} \quad k = 1, 2, \ldots N$$

wherein Arg denotes the angular phase of the argument of $W_{RX}^{(k)}$ and N is the number of elements in the array antenna; and means for applying the corresponding second cable phase weight set $W_{TX}^{(k)}$ as phase correction of the array antenna feed cables at transmit frequency $f_{TX}$, to thereby facilitate a continuous beam steering with coinciding receive and transmit directions.

6. The system according to claim 4, wherein an adaptive beam forming algorithm is used to compute a weight set that will produce a main transmit beam in the direction of one of the received signals.

7. The system according to claim 6, wherein a Sample Matrix Inversion (SMI) is utilized as an adaptive beam forming algorithm for computing a weight set producing a main transmit beam in a selected receive direction.

* * * * *